(12) United States Patent
Saigo et al.

(10) Patent No.: US 10,774,867 B2
(45) Date of Patent: Sep. 15, 2020

(54) BOLT, CONTROL APPARATUS, AND STRAIN MEASUREMENT SYSTEM

(71) Applicant: SANNOHASHI CORPORATION, Yashio-shi, Saitama (JP)

(72) Inventors: Fumitaka Saigo, Saitama (JP); Yutaka Takaku, Saitama (JP); Tomohiro Yamato, Saitama (UA); Ryo Sakazume, Saitama (JP)

(73) Assignee: SANNOHASHI CORPORATION, Yashio-Shi, Saitama (JP)

( * ) Notice: Subject to any disclaimer, the term of this patent is extended or adjusted under 35 U.S.C. 154(b) by 473 days.

(21) Appl. No.: 15/817,970

(22) Filed: Nov. 20, 2017

(65) Prior Publication Data
US 2018/0073542 A1 Mar. 15, 2018

Related U.S. Application Data

(63) Continuation of application No. PCT/JP2015/064431, filed on May 20, 2015.

(51) Int. Cl.
| | |
|---|---|
| *F16B 31/02* | (2006.01) |
| *G01L 1/26* | (2006.01) |
| *G01L 1/22* | (2006.01) |
| *G01L 5/24* | (2006.01) |
| *H02J 50/12* | (2016.01) |

(52) U.S. Cl.
CPC ............ *F16B 31/02* (2013.01); *G01L 1/225* (2013.01); *G01L 1/2281* (2013.01); *G01L 1/2287* (2013.01); *G01L 1/26* (2013.01); *G01L 5/24* (2013.01); *H02J 50/12* (2016.02)

(58) Field of Classification Search
CPC ................................. F16B 31/02; H02J 50/12
USPC ............................................. 411/14; 73/761
See application file for complete search history.

(56) References Cited

U.S. PATENT DOCUMENTS

| | | | | |
|---|---|---|---|---|
| 4,114,428 A | * | 9/1978 | Popenoe | G01B 7/22 331/65 |
| 6,843,628 B1 | * | 1/2005 | Hoffmeister | G06K 19/06009 411/14 |
| 7,293,466 B2 | * | 11/2007 | Ohta | F16B 31/02 257/417 |

(Continued)

FOREIGN PATENT DOCUMENTS

| | | |
|---|---|---|
| JP | H11118637 A | 4/1999 |
| JP | 2005114441 A | 4/2005 |

(Continued)

*Primary Examiner* — Gary W Estremsky
(74) *Attorney, Agent, or Firm* — Cantor Colburn LLP

(57) ABSTRACT

A bolt includes a body and a detecting portion. The body includes a shank and a head provided at one end of the shank. The detecting portion is configured to detect a strain in accordance with an axial force of the shank. The detecting portion includes a memory, a measuring portion, and a transmitting portion. The measuring portion is configured to operate by receiving a first wireless power feed, convert the strain into measurement data, and write the measurement data to the memory. The transmitting portion is configured to operate by receiving a second wireless power feed after the first wireless power feed, read the measurement data stored in the memory, and transmit the read measurement data.

16 Claims, 13 Drawing Sheets

(56) References Cited

U.S. PATENT DOCUMENTS

| | | | | |
|---|---|---|---|---|
| 7,412,898 B1* | 8/2008 | Smith | ............... | G01L 5/24 |
| | | | | 73/761 |
| 8,683,869 B2* | 4/2014 | Herley | ............... | F16B 31/02 |
| | | | | 73/760 |
| 8,810,370 B2* | 8/2014 | Tillotson | ............... | H04Q 9/00 |
| | | | | 340/10.1 |
| 2006/0123917 A1* | 6/2006 | Kibblewhite | ............... | G01L 5/246 |
| | | | | 73/761 |
| 2013/0068031 A1* | 3/2013 | Mekid | ............... | F16B 31/02 |
| | | | | 73/761 |
| 2013/0186951 A1* | 7/2013 | Zhu | ............... | F16B 31/02 |
| | | | | 235/375 |
| 2015/0061838 A1* | 3/2015 | Matsushita | ............... | H04Q 9/00 |
| | | | | 340/10.41 |

FOREIGN PATENT DOCUMENTS

| | | | |
|---|---|---|---|
| JP | 2005156569 A | | 6/2005 |
| JP | 2010185809 A | | 8/2010 |
| JP | 2010216804 A | | 9/2010 |

\* cited by examiner

BOLT, CONTROL APPARATUS, AND STRAIN MEASUREMENT SYSTEM

CROSS REFERENCE TO RELATED APPLICATION

This application is a continuation application of PCT/JP2015/064431 of an international application designating the United States of America filed on May 20, 2015. The entire content of the PCT application is incorporated herein by reference.

TECHNICAL FIELD

The present disclosure relates to a bolt that is capable of detecting a fastened state.

BACKGROUND

Japanese Patent Application Publication No. H11-118637 proposes a bolt that is capable of detecting a fastened state.

With the bolt disclosed in Japanese Patent Application Publication No. H11-118637, an axial force of a shank is detected by forming a hole in the bolt, inserting and fixing a strain gauge to the hole, and detecting a strain on the bolt with the strain gauge.

SUMMARY

However, the bolt disclosed in Japanese Patent Application Publication No. H11-118637 requires a battery in order to transmit an output of the strain gauge. Therefore, it is difficult to downsize a circuit. In addition, measurements can no longer be made once the battery reaches the end of its life.

The present disclosure provides a bolt capable of accurately detecting an axial force of a shank without including a battery in the bolt.

A bolt in accordance with one or more embodiments includes a body and a detecting portion. The body includes a shank and a head provided at one end of the shank. The detecting portion is configured to detect a strain in accordance with an axial force of the shank. The detecting portion includes a memory, a measuring portion, and a transmitting portion. The measuring portion is configured to operate by receiving a first wireless power feed, convert the strain into measurement data, and write the measurement data to the memory. The transmitting portion is configured to operate by receiving a second wireless power feed after the first wireless power feed, read the measurement data stored in the memory, and transmit the read measurement data.

A control apparatus in accordance with one or more embodiments is configured to control a detecting portion provided in a bolt. The control apparatus includes a power transmitting portion and a receiving portion. The power transmitting portion is configured to, by performing a first wireless power feed, cause the detecting portion to convert a strain on the bolt into measurement data, and cause the detecting portion to store the measurement data. The receiving portion is configured to, by performing a second wireless power feed after the first wireless power feed, cause the detecting portion to transmit the stored measurement data, and receive the measurement data.

A strain measurement system in accordance with one or more embodiments includes a bolt and a control apparatus. The control apparatus is configured to control a circuit provided in the bolt. The bolt includes a body and a detecting portion. The body includes a shank and a head provided at one end of the shank. The detecting portion is configured to detect a strain in accordance with an axial force of the shank. The detecting portion includes a memory, a measuring portion, and a communicating portion. The measuring portion is configured to, in accordance with a first wireless power feed, convert the strain into measurement data, and write the measurement data to the memory. The communicating portion that is configured to, in accordance with a second wireless power feed after the first wireless power feed, read the measurement data stored in the memory, and transmit the read measurement data. The control apparatus includes a power transmitting portion and a receiving portion. The power transmitting portion is configured to, by performing the first wireless power feed, cause the measuring portion to convert a strain on the bolt into the measurement data, and store the measurement data in the memory. The receiving portion is configured to, by performing the second wireless power feed after the first wireless power feed, cause the transmitting portion to transmit the stored measurement data, and receive the measurement data.

DETAILED DESCRIPTION

Figure 1:
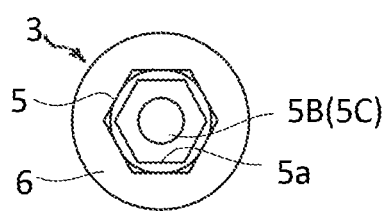
FIG. 1 is a top view of a head of a bolt according to a first embodiment.
Figure 2:
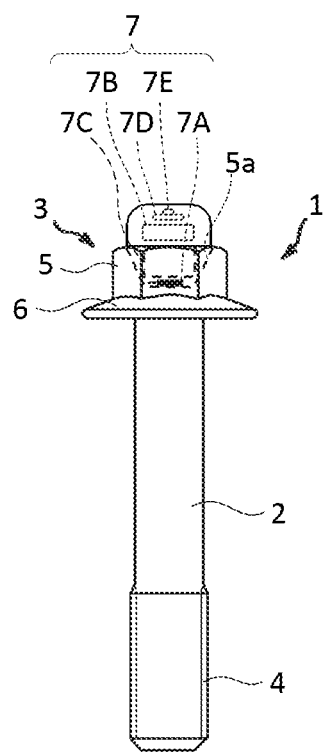
FIG. 2 is a front view of the bolt according to the first embodiment.
Figure 3:
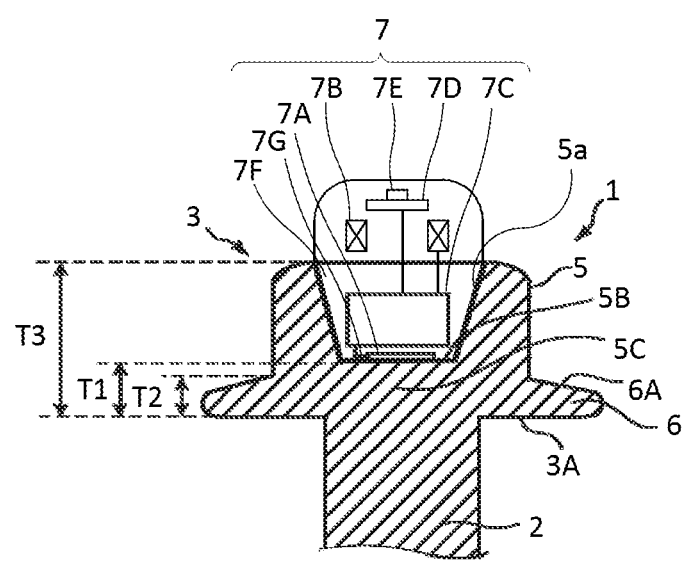
FIG. 3 is a sectional view of a vicinity of the head of the bolt according to the first embodiment.

A bolt according to an embodiment of some embodiments will be described with reference to the drawings. FIG. 1 is a top view of a head 3 of a bolt 1 according to a first embodiment, and FIG. 2 is a front view of the bolt 1 according to the first embodiment. Note that FIG. 1 does not show a strain detecting unit 7 but shows the head 3. FIG. 3 is a sectional view of a vicinity of the head 3 of the bolt 1 according to the first embodiment.

As shown in FIG. 1, the bolt 1, made of a steel material, includes a shank 2 having a cylindrical shape, a head 3 provided on one end of the shank 2, and the strain detection unit 7. A male screw 4 is formed on a side of the other end of the shank 2. The head 3 includes a recessed portion 5 with an outer circumference having a hexagonal pillar shape and a flange 6. As illustrated in FIG. 2, the head 3 has a contact surface 3A that comes into contact with an object to be fastened. A recess 5a is formed in the recessed portion 5, and the recessed portion 5 includes a bottom plate 5C serving as a bottom surface 5B of the recess 5a. The bottom plate 5C corresponds to a thin portion and to a deformed portion. The outer shape of the recessed portion 5 is not limited to the hexagonal shape, and may be a dodecagonal shape or a hexalobular shape. The recess 5a according to this embodiment is opened toward a side opposite to the shank 2. The strain detecting unit 7 corresponds to a detecting portion. The shank 2, the head 3, and the flange 6 may be referred to as a body or a metal body. The body may not include the flange 6.

The flange 6 is provided on the outer circumference of the recessed portion 5 and radially extends in a radial direction of the shank 2 from the outer circumference of the recessed portion 5. The flange 6 includes an opposite surface 6A on a side opposite to the contact surface 3A in an axial direction of the shank 2. A thickness T1 of the bottom plate 5C and a largest thickness T2 of the flange 6 are smaller than a largest thickness T3 of the head 3. The flange 6 corresponds to the thin portion and to the deformed portion.

In addition, the strain detecting unit 7 is disposed in the recess 5a. The strain detecting unit 7 includes a resistance strain gauge 7A, a power receiving coil 7B, a circuit portion 7C, a responder antenna 7D, and a responder circuit 7E. The resistance strain gauge 7A is a foil gauge constituted by a metallic foil bonded onto a base material and is a resistor which is adhered on the bottom surface 5B (an inner wall surface of the recess 5a on the shank 2 side) by an adhesive and which varies in accordance with a strain of the bottom plate 5C. The resistance strain gauge 7A is connected to the circuit portion 7C via a signal line 7G. The power receiving coil 7B is connected to the circuit portion 7C via a signal line. The responder antenna 7D is connected to the responder circuit 7E. The responder circuit 7E is connected to the circuit portion 7C via a signal line. In addition, the resistance strain gauge 7A, the power receiving coil 7B, the circuit portion 7C, the responder antenna 7D, and the responder circuit 7E are integrally constructed by a resin 7F and fixed to the recess 5a by an adhesive. Accordingly, manufacturing cost of the bolt 1 can be reduced.

The power receiving coil 7B has, for example, a cylindrical shape and generates a current by receiving an external magnetic flux. The circuit portion 7C executes a measurement process which involves receiving a current from the power receiving coil 7B, detecting a strain signal of the resistance strain gauge 7A, converting the strain signal into measurement data, and writing the measurement data to the responder circuit 7E. The responder antenna 7D has, for example, a planar shape, and receives an external interrogation signal and generates a current. The responder antenna 7D is, for example, a pattern antenna formed on a substrate. The responder circuit 7E executes a transmission process, in response to an interrogation signal, which involves reading measurement data, generating a response signal indicating the measurement data, and outputting the response signal to the responder antenna 7D. The responder antenna 7D transmits the response signal as an electromagnetic wave. The responder circuit 7E is, for example, an RFID (radio frequency identification) tag chip.

The power receiving coil 7B is arranged outside the recess 5a at a distance from the head 3 and is supported by the resin 7F. In addition, the responder antenna 7D is arranged on an opposite side to the recess 5a with respect to the power receiving coil 7B and is supported by the resin 7F. The responder circuit 7E is arranged on a substrate of the responder antenna 7D. Accordingly, the power receiving coil 7B, the responder antenna 7D, and the responder circuit 7E is arranged at a distance from the metal body of the head 3.

Figure 4:
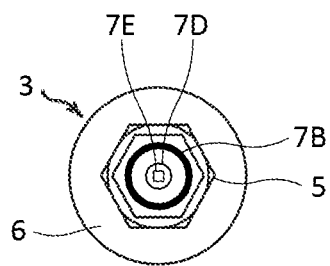
FIG. 4 is a top view of the strain detecting unit according to the first embodiment.

FIG. 4 is a top view of the strain detecting unit 7 according to the first embodiment.

The power receiving coil 7B and the responder antenna 7D are coaxially arranged with an axis of the shank 2. However, the power receiving coil 7B and the responder antenna 7D may not be coaxial with the axis of the shank 2. The responder antenna 7D may be arranged on an outer circumference of the power receiving coil 7B. A region where the strain detecting unit 7 including the power receiving coil 7B and the responder antenna 7D is projected in an axial direction of the shank 2 may be inside an outer circumference of a region where the recessed portion 5 is projected in the axial direction of the shank 2. Accordingly, interference of the strain detecting unit 7 by tools when fastening the bolt 1 can be avoided.

Figure 5:
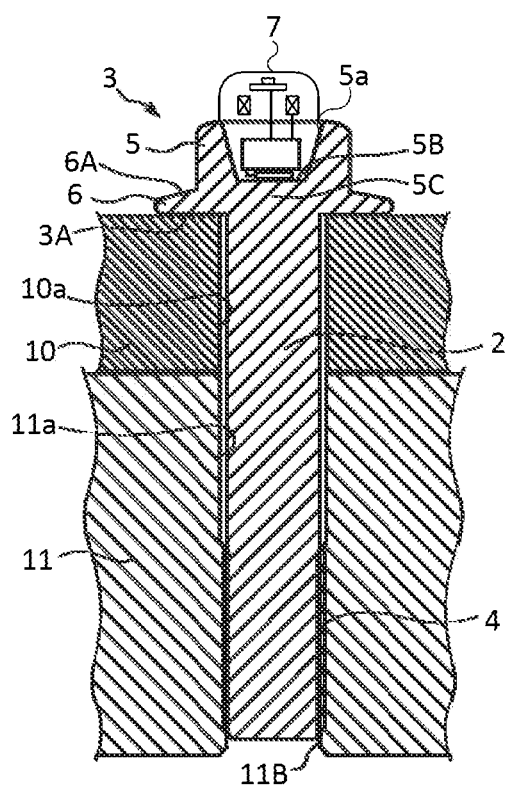
FIG. 5 is a diagram illustrating a state where objects to be fastened are fastened by the bolt.

FIG. 5 is a state where objects to be fastened are fastened by the bolt 1 according to the present embodiment. A first insertion hole 10a is formed in a first fastened object 10. A second insertion hole 11a is formed in a second fastened object 11. A female screw 11B is formed on an inner circumference surface, defining the second insertion hole 11a, and on one side of the second fastened object 11.

The shank 2 of the bolt 1 is inserted into the first and the second insertion holes 10a and 11a, and the male screw 4 of the bolt 1 and the female screw 11B of the second fastened object 11 are screwed together. Thus, the first and the second fastened objects 10 and 11 are fastened by the bolt 1. When the bolt 1 is tightened, a fastening tool, having an inner circumference shape corresponding to the outer circumference shape of the recessed portion 5 rotates the bolt 1 while covering the recessed portion 5, so that the male screw 4 of the bolt 1 and the female screw 11B of the second fastened object 11 are screwed together.

In a state where the first and the second fastened objects 10 and 11 are fastened by the bolt 1, the contact surface 3A of the head 3 presses the first fastened object 10. The head 3 receives counter force, with respect to the pressing, from the first fastened object 10, and thus axial force is generated in the shank 2. The head 3 is pulled toward the first fastened object 10 by the axial force. As a result, stress is concentrated on the bottom plate 5C and the flange 6 having the thicknesses smaller than the largest thickness T3 of the head 3. Thus, these portions are more deformed than other portions of the head 3. In other words, the stress based on the axial force of the shank 2 is concentrated on the thin portions, so that the thin portions function as the deformed portions that are more deformed than the other portions of the head 3.

In addition, electrical resistance of the resistance strain gauge 7A varies in accordance with a strain generated on the bottom plate 5C (the bottom surface 5B). When a control apparatus (not shown) generates a magnetic flux toward the power receiving coil 7B, the power receiving coil 7B generates a current in accordance with the magnetic flux and supplies the current to the circuit portion 7C. The circuit portion 7C having been supplied the current detects an electrical resistance of the resistance strain gauge 7A, converts the electrical resistance into measurement data, and stores the measurement data. Subsequently, when the responder antenna 7D receives an interrogation signal from the control apparatus, the circuit portion 7C generates a current in accordance with the interrogation signal, converts the stored measurement data into a response signal, and transmits the response signal to the control apparatus, and the control apparatus receives the transmitted response signal. In this manner, the strain detecting unit 7 detects, stores, and transmits a strain generated on the bottom plate 5C (the bottom surface 5B) as measurement data.

After a predetermined period of time has elapsed after the first and the second fastened objects 10 and 11 have been fastened by the bolt 1, the resistance of the resistance strain gauge 7A is detected to determine whether the bolt 1 is appropriately fastened.

When the bolt 1 has loosened, the axial force of the shank 2 is reduced and the amount of strain on the bottom plate 5C is changed accordingly. As a result, the resistance of the resistance strain gauge 7A changes. When the bolt 1 is appropriately fastened, there is almost no change in the axial force of the shank 2 and almost no change in the amount of strain on the bottom plate 5C. Thus, there is almost no change in the resistance of the resistance strain gauge 7A.

Thus, the fastened state of the bolt 1 can be detected by comparing the initial resistance of the resistance strain gauge 7A after the fastening and the resistance of the resistance strain gauge 7A after the predetermined period of time has elapsed. More specifically, it can be determined that the bolt 1 has loosened when the detected resistance largely differs from the initial resistance of the resistance strain gauge 7A after the fastening. It can be determined that the bolt 1 is appropriately fastened, when the detected resistance does not largely differ from the initial resistance of the resistance strain gauge 7A after the fastening.

As described above, in the bolt 1 according to the present embodiment, the head 3 has the bottom plate 5C (deformed portion) with a thickness, in the axial direction of the shank 2, smaller than the other portions and thus is more deformed by the axial force of the shank 2 than the other portions. The strain detection unit 7 detects the strain on the bottom plate 5C corresponding to the axial force of the shank 2. The thickness of the bottom plate 5C is smaller than the largest thickness of the head 3, in the axial direction of the shank 2. Thus, the strain on the portion is detected with the portion that is sensitive to the change in the axial force of the shank 2 formed in the head 3. Thus, the strain detection unit 7 can accurately and easily detect the change in the axial force of the shank 2, whereby the fastened state of the bolt 1 can be accurately confirmed.

The strain detection unit 7 detects the strain on the bottom plate 5C, with the recessed portion 5, including the bottom plate 5C as the thin portion, provided in the head 3. The recessed portion 5 can be easily formed in the head 3, whereby the bolt 1 that can have the fastened state accurately confirmed and involves no complex operation, long operation time, or high cost can be obtained.

Next, details of the strain detecting unit 7 will be described.

Figure 6:
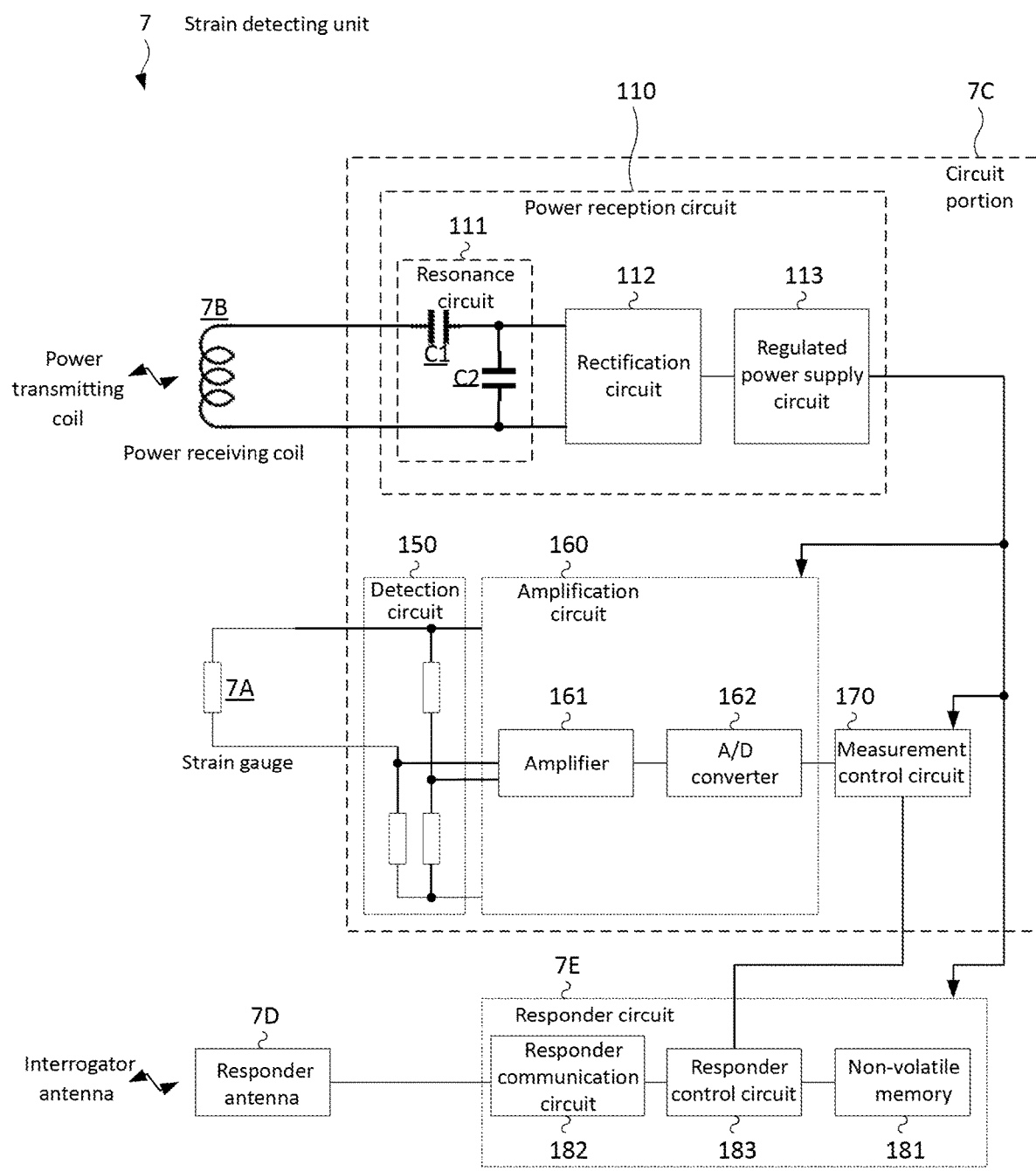
FIG. 6 is a block diagram showing a configuration of a strain detecting unit.

FIG. 6 is a block diagram showing a configuration of the strain detecting unit 7.

As described earlier, the strain detecting unit 7 includes the resistance strain gauge 7A, the power receiving coil 7B, the circuit portion 7C, the responder antenna 7D, and the responder circuit 7E. The circuit portion 7C includes a power reception circuit 110, a detection circuit 150, an amplification circuit 160, and a measurement control circuit 170.

The power receiving coil 7B generates AC power in accordance with a fluctuation in magnetic flux from the control apparatus. In place of the resistance strain gauge 7A, other strain detecting elements which vary other electric characteristics in accordance with a strain such as a piezoelectric element may be used.

The power reception circuit 110 includes a resonance circuit 111, a rectification circuit 112, and a regulated power supply circuit 113.

The resonance circuit 111 includes a capacitor C1 and a capacitor C2. The capacitor C1 is connected in series to the power receiving coil 7B and is also connected in series to the rectification circuit 112. The capacitor C2 is connected in series to the capacitor C1 and is also connected in parallel to the rectification circuit 112. The power receiving coil 7B and the resonance circuit 111 constitute an LC circuit having a resonance frequency (the first frequency) that is determined based on an inductance of the power receiving coil 7B and a capacitance of the resonance circuit 111. The capacitance of the resonance circuit 111 is a sum of a capacitance of the capacitor C1 and a capacitance of the capacitor C2. Regarding to a relationship between a gap from a power transmitting coil to the power receiving coil 7B and output power that is output from the resonance circuit 111, when necessary capacitance is divided between the capacitors C1 and C2 as in the case of the resonance circuit 111, a variation in the output power with respect to a variation in the gap is reduced in comparison to a case where the necessary capacitance is not divided. Accordingly, the power reception circuit 110 is capable of receiving stable power in a gap of a wide range. The rectification circuit 112 converts AC power from the resonance circuit 111 into DC power. The regulated power supply circuit 113 converts DC power from the rectification circuit 112 into preset voltage. The regulated power supply circuit 113 supplies the converted DC power to the amplification circuit 160, the measurement control circuit 170, and the responder circuit 7E.

The detection circuit 150 constitutes a bridge circuit (a Wheatstone bridge circuit) together with the resistance strain gauge 7A. Accordingly, the detection circuit 150 outputs voltage in accordance with the electrical resistance of the resistance strain gauge 7A. The bridge circuit may include one resistance strain gauge 7A and three resistors, two resistance strain gauges 7A and two resistors, or four resistance strain gauges 7A.

The amplification circuit 160 operates using power from the power reception circuit 110. The amplification circuit 160 includes an amplifier 161 and an A/D converter 162. The amplifier 161 amplifies voltage output from the detection circuit 150. The A/D converter 162 generates strain data by subjecting amplified voltage to A/D conversion. The amplification circuit 160 is, for example, a signal conditioner. Alternatively, the amplification circuit 160 may be a dynamic strain amplifier.

The measurement control circuit 170 operates using power from the power reception circuit 110. The measurement control circuit 170 filters time-sequential strain data input from the amplification circuit 160 and outputs obtained measurement data to the responder circuit 7E. Examples of filtering include removal of high frequency components and averaging. Accordingly, the strain detecting unit 7 can reduce an effect of noise on measurement data.

The responder circuit 7E operates using power from the power reception circuit 110 or power from the responder antenna 7D. The responder circuit 7E includes a non-volatile memory 181, a responder communication circuit 182, and a responder control circuit 183. The non-volatile memory 181 stores an identifier of the responder circuit 7E written in advance, measurement data input from the measurement control circuit 170, reception data received by the responder communication circuit 182, and the like. The responder communication circuit 182 generates power from an interrogation signal that is an electromagnetic wave received by the responder antenna 7D, demodulates the interrogation signal with the power to acquire interrogation data, and outputs the interrogation data to the responder control circuit 183. When power is supplied from the power reception circuit 110 and measurement data is input from the measurement control circuit 170, the responder control circuit 183 writes the measurement data to the non-volatile memory 181. In addition, the responder control circuit 183 reads measurement data and an identifier from the non-volatile memory 181 in accordance with the interrogation signal, generates response data including the measurement data and the identifier, and outputs the response data to the responder communication circuit 182. The responder communication circuit 182 generates, in accordance with the response data, a response signal by modulating a carrier wave of the interrogation signal with the response data, and outputs the response signal to the responder antenna 7D. The responder circuit 7E is, for example, an RFID tag chip. Since using an RFID tag chip as the responder circuit 7E enables the responder circuit 7E to transmit measurement data together with an identifier, the strain detecting unit 7 need not have a separate transmission circuit for transmitting measurement data. Accordingly, downsizing and cost reduction of the strain detecting unit 7 can be achieved.

Due to the strain detecting unit 7 including a bridge circuit and amplifying voltage output from the bridge circuit by the amplifier 161, a minute strain can be accurately detected.

Alternatively, the amplification circuit 160 may include a temperature sensor. In this case, the strain detecting unit 7 may perform temperature compensation of an output of the bridge circuit based on an output of the temperature sensor. In addition, the strain detecting unit 7 may convert the output of the temperature sensor into temperature data and write the temperature data to the non-volatile memory 181 in the measurement process, and transmit the temperature data to the control apparatus in the transmission process. Accordingly, the control apparatus can perform temperature compensation of measurement data.

The resistance strain gauge 7A, the power receiving coil 7B, and the circuit portion 7C correspond to a measuring portion. The responder antenna 7D, the responder communication circuit 182, and the responder control circuit 183 correspond to a transmitting portion. The resistance strain gauge 7A and the detection circuit 150 correspond to a strain detection circuit. The power reception circuit 110, the amplification circuit 160, and the measurement control circuit 170 correspond to a measurement circuit. The responder antenna 7D corresponds to a communication antenna. The responder communication circuit 182 and the responder control circuit 183 correspond to a communication circuit.

Next, a control apparatus 300 will be described.

The control apparatus 300 executes an instruction process which involves generating a magnetic flux and performing a wireless power feed (a first wireless power feed) to cause the strain detecting unit 7 to convert a strain of the bolt 1 into measurement data and store the measurement data. In addition, the control apparatus 300 executes an acquisition process which involves transmitting an electromagnetic wave and performing a wireless power feed (a second wireless power feed) to cause the strain detecting unit 7 to read measurement data and transmit the measurement data.

Figure 7:
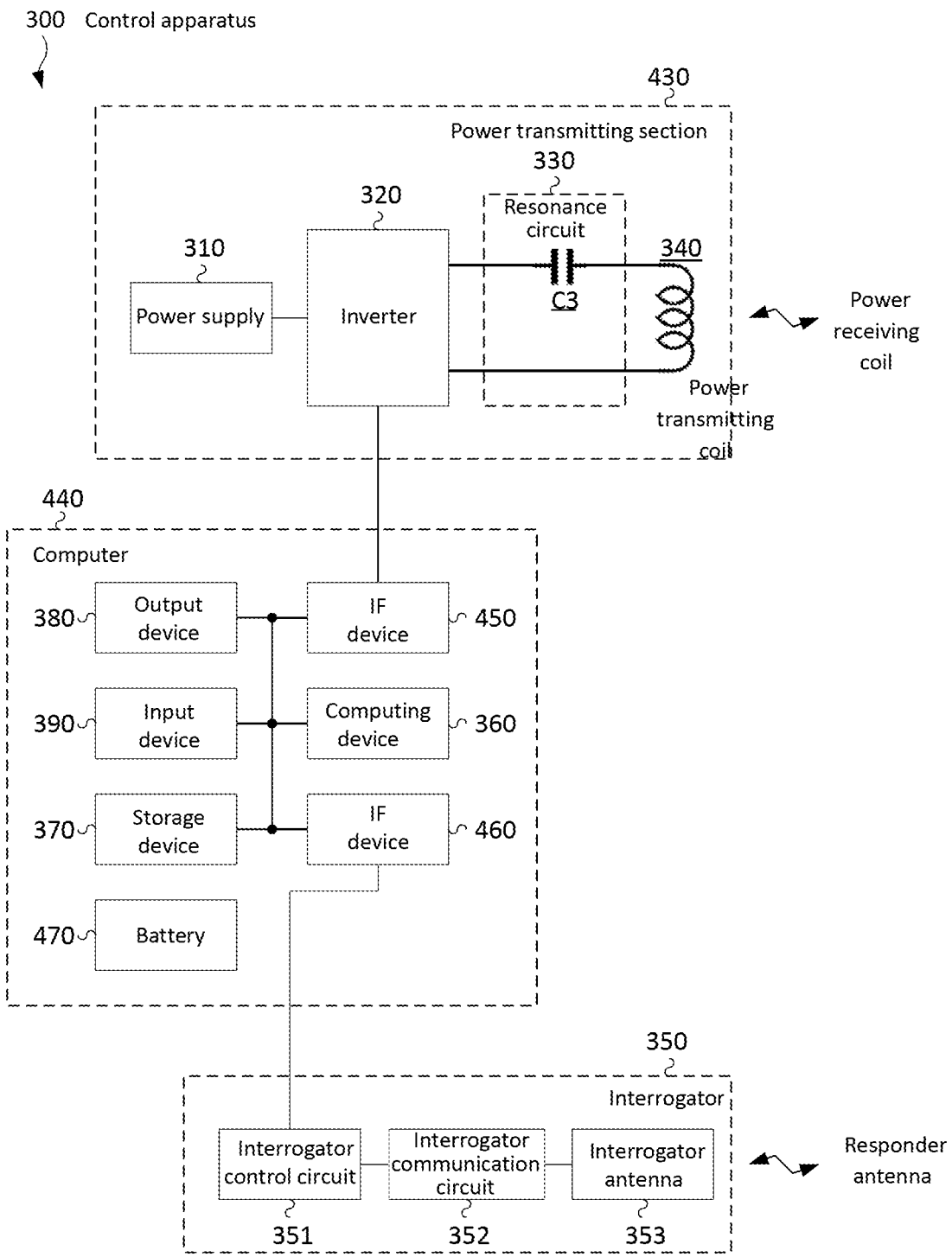
FIG. 7 is a block diagram showing a configuration of a control apparatus.

FIG. 7 is a block diagram showing a configuration of the control apparatus 300.

The control apparatus 300 includes a power transmitting portion 430, a computer 440, and an interrogator 350.

The power transmitting portion 430 includes a power supply 310, an inverter 320, a resonance circuit 330, and a power transmitting coil 340.

The power supply 310 is, for example, a battery and supplies power to the inverter 320. A commercial power supply may be used in place of a battery. Using a battery as the power supply 310 enables the control apparatus 300 to be portable. In addition, the control apparatus 300 may be mounted to a mobile body such as a drone or a robot. Accordingly, even when the bolt 1 is provided at a high place or a location not easily accessible by a user, the instruction process and the acquisition process can be readily executed.

The inverter 320 operates in accordance with an instruction from the computer 440. The inverter 320 converts DC power supplied from the battery into AC power having a preset resonance frequency (the first frequency). The resonance circuit 330 includes a capacitor C3. The capacitor C3 and the power transmitting coil 340 constitute an LC circuit and have a resonance frequency thereof. The resonance frequency is determined by an inductance of the power transmitting coil 340 and a capacitance of the capacitor C3. The resonance frequency is, for example, several ten kHz. The resonance frequency is equal to the resonance frequency of the power receiving coil 7B and the power reception circuit 110. The power transmitting coil 340 generates a magnetic flux in accordance with the AC power supplied from the inverter 320 via the resonance circuit 330.

The interrogator 350 operates in accordance with an instruction from the computer 440. The interrogator 350 includes an interrogator control circuit 351, an interrogator communication circuit 352, and an interrogator antenna 353. The interrogator control circuit 351 outputs to the interrogator communication circuit 352, in accordance with an instruction from a computing device 360, interrogation data for acquiring response data from the strain detecting unit 7. The interrogator communication circuit 352 generates a carrier wave, generates an interrogation signal by modulating the carrier wave with the interrogation data, and outputs the interrogation signal to the interrogator antenna 353. The interrogator antenna 353 transmits the interrogation signal as an electromagnetic wave. A frequency (the second frequency) of the carrier wave of the interrogation signal is higher than a frequency of the magnetic flux from the power transmitting coil 340 and is, for example, several hundred MHz (UHF band). The interrogation signal may include an instruction to the responder circuit 7E such as a command. In addition, the interrogator antenna 353 receives a response signal that is an electromagnetic wave from the responder antenna 7D of the strain detecting unit 7. The interrogator communication circuit 352 converts the response signal into response data by demodulating the response signal. The interrogator control circuit 351 transmits an identifier and measurement data included in the response data to the computer 440. The interrogator 350 is, for example, an RFID reader/writer. Using such an existing circuit as the interrogator 350 enables downsizing and cost reduction of the control apparatus 300 to be achieved.

The computer 440 includes the computing device 360, a storage device 370, an output device 380, an input device 390, an interface (IF) device 450, an interface (IF) device 460, and a battery 470.

The storage device 370 stores programs and data used by the computing device 360. The storage device 370 is, for example, an HDD (Hard Disk Drive), a flash memory device, a ROM, or a RAM. The output device 380 outputs data from the computing device 360 to the user. The output device 380 is a display, a speaker, an LED lamp, or the like.

The input device 390 outputs data input by a user to the computing device 360. The input device 390 is a touch panel, a keyboard, a mouse, a button, or the like. The battery 470 supplies power to respective parts of the computer 440. A commercial power supply may be used in place of the battery 470.

The computing device 360 executes processes in accordance with programs stored in the storage device 370. For example, as the instruction process, the computing device 360 operates the inverter 320 to operate the amplification circuit 160 and the measurement control circuit 170 of the strain detecting unit 7. In addition, as the acquisition process, the computing device 360 operates the interrogator 350 to operate the responder circuit 7E of the strain detecting unit 7. Furthermore, the computing device 360 may execute a computing process in which an identifier and data such as measurement data obtained by the acquisition process are computed. In addition, the computing device 360 writes data to the storage device 370 and reads data from the storage device 370. Furthermore, the computing device 360 causes the output device 380 to display information based on data. Moreover, the computing device 360 accepts data from the input device 390 and outputs the data to the storage device 370. The computing device 360 is a CPU or the like.

The computing device 360 executes the instruction process in response to an input to the input device 390 and subsequently executes the acquisition process. Alternatively, the computing device 360 may repetitively execute the instruction process and the acquisition process.

In the instruction process, the computing device 360 operates the inverter 320 to vary a magnetic flux in accordance with AC power from the power transmitting coil 340. When the power receiving coil 7B receives a magnetic flux in the strain detecting unit 7, the amplification circuit 160, the measurement control circuit 170, and the responder circuit 7E operate to execute the measurement process. Accordingly, the strain detecting unit 7 generates measurement data based on voltage output from the detection circuit 150 and writes the measurement data to the non-volatile memory 181.

In the acquisition process, the computing device 360 operates the interrogator 350 to transmit an interrogation signal from the interrogator 350. When the responder antenna 7D receives the interrogation signal in the strain detecting unit 7, the responder circuit 7E operates and executes the transmission process. Accordingly, the strain detecting unit 7 reads measurement data from the non-volatile memory 181 and transmits a response signal including an identifier and the measurement data. When the interrogator 350 receives the response signal, the interrogator 350 acquires the identifier and the measurement data from the response signal and sends the identifier and the measurement data to the computing device 360. The computing device 360 writes the identifier and the measurement data to the storage device 370, executes a computation of measurement data, and causes the output device 380 to output a computation result. Using an RFID tag chip as the responder circuit 7E enables the computing device 360 to use an identifier set in advance to each responder circuit 7E as an identifier (a bolt ID) of a corresponding bolt 1. Accordingly, the control apparatus 300 can receive a bolt ID together with measurement data and, even when there is a plurality of bolts 1, the bolt 1 that is a target of the acquisition process can be identified.

For example, by executing the instruction process and the acquisition process in advance, the computing device 360 acquires measurement data for each bolt ID and writes the obtained measurement data to the storage device 370 as reference data. Subsequently, by executing the instruction process and the acquisition process after a prescribed amount of time has elapsed, the computing device 360 acquires a bolt ID and latest measurement data and, in the computing process, the computing device 360 reads reference data corresponding to the acquired bolt ID from the storage device 370, calculates a ratio of the latest measurement data to the reference data, and determines whether or not the ratio is lower than a ratio threshold set in advance. When it is determined that the ratio is lower than the ratio threshold, the computing device 360 causes the output device 380 to output information set in advance. The output information may be a character, an image, a color, a sound, or a combination thereof. Accordingly, the user can readily recognize loosening of a bolt. The computing device 360 may cause the output device 380 to display the bolt ID together with the output information A plurality of ranges may be set in advance with respect to the ratio, and output information corresponding to the ranges may be set in advance. For example, when ranges of three steps are set, the computing device 360 may cause the output device 380 to display red when the calculated ratio is in a lowest range among the three steps, cause the output device 380 to display yellow when the calculated ratio is in an intermediate range among the three steps, and cause the output device 380 to display green when the calculated ratio is in a highest range among the three steps. Accordingly, the user can readily recognize loosening of a bolt.

In addition, the computing device 360 may calculate correction data based on an identifier and measurement data, and write the correction data to the storage device 370. In this case, in the computing process, the computing device 360 corrects the measurement data using the correction data corresponding to the identifier. Accordingly, a variation in the bolt 1, a variation in the resistance strain gauge 7A, a variation in adhesion of the resistance strain gauge 7A, and the like can be corrected for each bolt 1 and the accuracy of determination can be improved.

The computer 440 may be a general-purpose computer such as a PC, a smartphone, and a tablet terminal. Accordingly, cost can be reduced. In addition, the computer 440 may include a communication device. Connecting the computer 440 to another computer via a communication network enables measurement data of a plurality of control apparatuses 300 and measurement data at a remote location to be collected by the other computer. The output device 380 and the input device 390 may be a touch panel display.

Moreover, the interrogator antenna 353 corresponds to a communication control antenna. The interrogator control circuit 351 and the interrogator communication circuit 352 correspond to a communication control circuit.

Next, a shape of the control apparatus 300 will be described.

Figure 8:
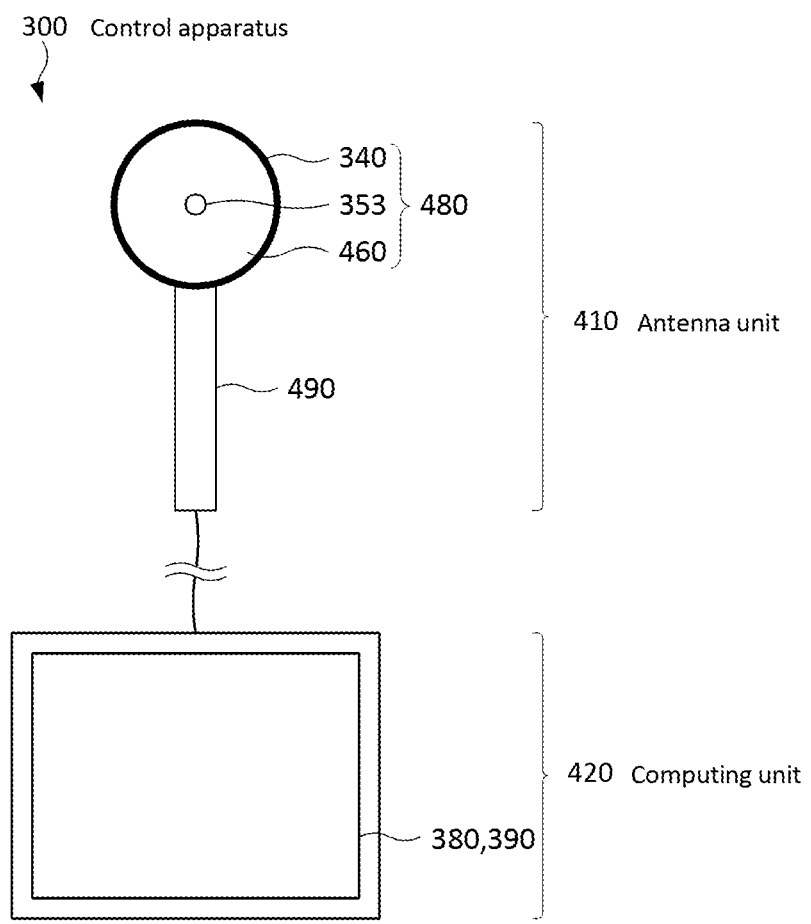
FIG. 8 is a shape of the control apparatus according to this embodiment.

FIG. 8 is a shape of the control apparatus 300.

The control apparatus 300 includes an antenna unit 410 and a computing unit 420. The antenna unit 410 is gripped by the user and brought close to the strain detecting unit 7 of the bolt 1 during the instruction process and the acquisition process. The antenna unit 410 is connected to the computing unit 420 via a cable. The antenna unit 410 and the computing unit 420 may be separable from each other. The computing unit 420 performs output such as display of a measurement result.

The computing unit 420 includes, for example, the computer 440. The antenna unit 410 includes, for example, the power transmitting portion 430 and the interrogator 350.

A shape of the antenna unit 410 resembles that of a tennis racket. The antenna unit 410 includes an antenna portion 480 and a grip 490. The power supply 310, the inverter 320, the resonance circuit 330, the interrogator control circuit 351, and the interrogator communication circuit 352 are arranged inside the grip 490. The antenna portion 480 includes a support plate 460, the power transmitting coil 340, and the interrogator antenna 353. The support plate 460 is arranged at a tip of the grip 490. In the surfaces of the support plate 460, a surface that faces the bolt 1 will be referred to as an arrangement surface. The power transmitting coil 340 has, for example, a cylindrical shape and is arranged on the arrangement surface of the support plate 460. An opening of the power transmitting coil 340 is oriented in a normal direction of the arrangement surface. The interrogator antenna 353 has, for example, a planar shape and is arranged on an axis of the power transmitting coil 340 on the arrangement surface. Alternatively, the axis of the power transmitting coil 340 may be parallel to an axis of the grip 490 or may be oriented in a different direction.

Alternatively, the power transmitting coil 340 may be a spiral planar coil. In this case, the power transmitting coil 340 may be provided on the arrangement surface and the interrogator antenna 353 may be provided at a center of the power transmitting coil 340.

Dividing the control apparatus 300 into the antenna unit 410 and the computing unit 420 enables a size and a weight of the antenna unit 410 to be reduced and facilitates operations of the antenna unit 410. Alternatively, a part of the power transmitting portion 430 and/or a part of the interrogator 350 may be provided in the computing unit 420. For example, the computing unit 420 may include the power supply 310 or the battery 470 may be used in place of the power supply 310. Accordingly, the size and the weight of the antenna unit 410 can be reduced.

Figure 9:
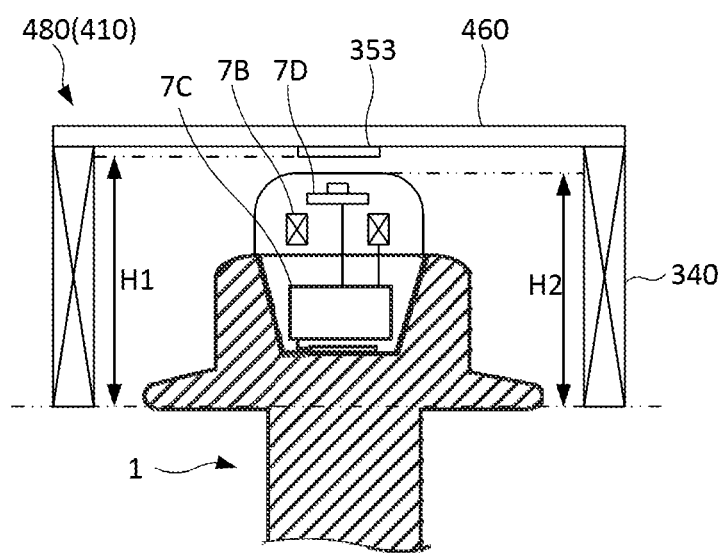
FIG. 9 is a sectional view showing a positional relationship between the bolt and the antenna unit during the instruction process and the acquisition process.

FIG. 9 is a sectional view showing a positional relationship between the bolt 1 and the antenna unit 410 during the instruction process and the acquisition process.

The user operates the control apparatus, grips the grip 490, and brings the antenna portion 480 close to the strain detecting unit 7 so as to place the antenna portion 480 on the head 3 of the bolt 1. At this point, the control apparatus 300 executes the instruction process by performing power transmission from the power transmitting coil 340 and subsequently executes the acquisition process.

In this case, an inner circumference of the power transmitting coil 340 is larger than an outer circumference of the recessed portion 5 or the head 3. Accordingly, the user can place the recessed portion 5 inside a hollow portion of the power transmitting coil 340 from the opening of the power transmitting coil 340. In addition, the interrogator antenna 353 is arranged on an opposite side to the opening of the power transmitting coil 340 with respect to the center of the power transmitting coil 340 on the axis of the power transmitting coil 340. Accordingly, the user can place the antenna portion 480 on the recessed portion 5. Furthermore, by simply placing the antenna portion 480 on the recessed portion 5, the user can readily maintain the positional relationship between the power transmitting coil 340 and the power receiving coil 7B and the positional relationship between the interrogator antenna 353 and the responder antenna 7D. Efficiency can be enhanced and reliability can be improved in both power transmission between the power transmitting coil 340 and the power receiving coil 7B and power transmission between the interrogator antenna 353 and the responder antenna 7D. Even in a state where the recessed portion 5 is not enclosed by the power transmitting coil 340, power reception by the power receiving coil 7B and reception by the responder antenna 7D are enabled.

According to the positional relationship described above, due to the power transmitting coil 340 being positioned on an outer side of the power receiving coil 7B, in the instruction process, a part of a magnetic flux passing through the power transmitting coil 340 passes through the power receiving coil 7B and enables power to be supplied to the strain detecting unit 7. In addition, due to the power receiving coil 7B being arranged on an outer side of the recess 5a at a distance from the metal body of the head 3, since the magnetic flux from the power transmitting coil 340 passes between the power receiving coil 7B and the recess 5a and through the power receiving coil 7B, wireless power feed can be performed efficiently. Furthermore, due to the power receiving coil 7B being arranged at a distance from the circuit portion 7C, the circuit portion 7C can be housed inside the recess 5a.

In addition, according to the positional relationship described above, due to the interrogator antenna 353 opposing the responder antenna 7D, in the acquisition process, the responder antenna 7D can reliably receive an electromagnetic wave from the interrogator antenna 353 and the interrogator antenna 353 can reliably receive an electromagnetic wave from the responder antenna 7D. Furthermore, since a frequency of the electromagnetic wave of the interrogator antenna 353 is higher than a frequency of the magnetic flux from the power transmitting coil 340 and electric field intensity of the interrogator antenna 353 in the normal direction increases, the interrogator antenna 353 desirably opposes the responder antenna 7D. In addition, in the positional relationship described above, due to the responder antenna 7D being arranged on the interrogator antenna 353 side with respect to the power receiving coil 7B, an electromagnetic wave between the interrogator antenna 353 and the responder antenna 7D can propagate without being blocked by the power receiving coil 7B. Furthermore, the use of a UHF band electromagnetic wave by the interrogator antenna 353 and the responder antenna 7D enables the responder antenna 7D and the responder circuit 7E to be downsized and communication distance to be increased. In addition, an effect of metal in the periphery can be suppressed as compared to electromagnetic waves with a lower frequency. Furthermore, due to the responder antenna 7D being arranged at a distance from the metal body of the head 3, the circuit portion 7C can be housed inside the metal body of the head 3. Accordingly, the circuit portion 7C can be downsized.

Moreover, a distance H1 from an opening surface of the power transmitting coil 340 to the interrogator antenna 353 may be longer than a distance H2 from a lower surface of the head 3 to a highest point of the strain detecting unit 7. Accordingly, when the user places the antenna portion 480 on the head 3, the interrogator antenna 353 can be prevented from coming into contact with the strain detecting unit 7 even when the opening surface of the power transmitting coil 340 is in contact with a fastened target.

Alternatively, the antenna unit 410 may include the input device 390. For example, the input device 390 is a button provided on a surface of the grip 490. In this case, when the button is pressed, the computing device 360 executes the instruction process and the acquisition process.

In addition, the antenna unit 410 may include the power supply 310. Furthermore, instead of using the cable between the antenna unit 410 and the computing unit 420, each of the antenna unit 410 and the computing unit 420 may include a wireless communication circuit and a power supply and may perform wireless communication. In this case, the antenna unit may transmit an identifier and measurement data acquired in the acquisition process to the computing unit 420.

Alternatively, the control apparatus 300 may acquire and store first measurement data from the strain detecting unit 7 by executing the acquisition process, acquire second measurement data from the strain detecting unit 7 by subsequently executing the instruction process and then executing the acquisition process, and compare the first measurement data and the second measurement data with each other or calculate a proportion (ratio) of the second measurement data to the first measurement data by executing the computing process. In this case, the control apparatus 300 can compare previous measurement data with current measurement data without having to continuously store previous measurement data of the target bolt 1.

By executing the instruction process and the acquisition process, the control apparatus 300 may calculate axial forces of a plurality of bolts 1 in a structure, calculate a distribution of axial forces of the plurality of bolts 1 or determination results in the structure using positional information of the plurality of bolts 1 in the structure, and display the distribution.

Since the bolt 1 stores measurement data during the instruction process, after consecutively executing the instruction process with respect to a plurality of bolts 1, the control apparatus 300 may consecutively execute the acquisition process with respect to the bolts 1 to acquire bolt IDs and measurement data of the plurality of bolts 1.

In addition, the control apparatus 300 may be divided into an instruction processing unit for the instruction process and an acquisition processing unit for the acquisition process. In this case, the instruction processing unit may include the power transmitting coil 340, the resonance circuit 330, and the inverter 320, and the acquisition processing unit may include the interrogator 350. For example, after consecutively executing the instruction process with respect to a plurality of bolts 1 using the instruction processing unit, the user may consecutively execute the acquisition process with respect to the plurality of bolts 1 using the acquisition processing unit.

The control apparatus 300 may calculate a value corresponding to an axial force [kgN] based on measurement data. In this case, the control apparatus 300 measures and records an initial fastening axial force Fo that is an axial force when the bolt 1 is fastened, measures an axial force Fi after a prescribed maintenance time has elapsed therefrom, and calculates an axial force difference Fo−Fi. The control apparatus 300 determines that the bolt 1 is loose when the axial force difference exceeds a prescribed positive axial force difference threshold.

When the first fastened object 10 and the second fastened object 11 are fastened by a plurality of bolts including the bolt 1, the control apparatus 300 may further determine whether the axial force difference falls below a negative axial force difference threshold. The axial force difference below the negative axial force difference threshold might be indicating that bolts other than the bolt 1 in the plurality of bolts have loosened and the load that had been imposed on such the bolts is now imposed on the bolt 1. Thus, the bolt 1 can be used for detecting loosening of other bolts around the bolt 1. When the axial force difference falls below the negative axial force difference threshold, the user reexamines all the bolts other than the bolt 1. Thus, the strain detection unit 7 needs not to be provided to all of the plurality of bolts, whereby an attempt to achieve cost reduction is facilitated.

According to the present embodiment, due to the strain detecting unit 7 being configured to write measurement data to the non-volatile memory 181 but not to transmit measurement data in the instruction process, the control apparatus 300 can execute the instruction process and the acquisition process at different timings.

When current flows through the power transmitting coil 340 for a long period of time, the metal body of the bolt 1 and the strain detecting unit 7 become heated. Since a duration of the instruction process is sufficiently shorter than the period of current flow, heat generation can be prevented. In addition, by performing the acquisition process after the instruction process, an effect of wireless power feed during the instruction process on the acquisition process and an effect of wireless power feed during the acquisition process on the instruction process such as a decline in accuracy due to an occurrence of noise, a malfunction, and heat generation by the responder circuit 7E can be prevented and reliability of respective operations of the instruction process and the acquisition process can be improved.

Due to the frequency of the responder antenna 7D being higher than the frequency of the power receiving coil 7B, an effect of wireless power feed during the instruction process on the acquisition process and an effect of wireless power feed during the acquisition process on the instruction process such as a decline in accuracy due to an occurrence of noise, a malfunction, and heat generation by the responder circuit 7E can be prevented. In addition, the responder antenna 7D and the responder circuit 7E can be downsized.

Furthermore, when strain is small as in the case of the bottom surface 5B of the recess 5a, by amplifying a strain signal with the amplifier 161, measurements can be made with high accuracy.

The amplifier 161 requires power larger than that necessary for transmission by the responder circuit 7E. Due to the strain detecting unit 7 not transmitting measurement data in the instruction process, power from the power receiving coil 7B can be efficiently supplied to the amplifier 161. Supplying sufficient power for amplification enables measurements to be made with high accuracy even when strain is small.

Alternatively, the strain detecting unit 7 may include another memory such as a volatile memory in place of the non-volatile memory 181. When the strain detecting unit 7 includes a volatile memory, the strain detecting unit 7 includes a power storage circuit such as a capacitor that stores power from the power reception circuit 110. In this case, in the instruction process, the power storage circuit stores power from the power reception circuit 110 and, after the measurement control circuit 170 writes measurement data to the volatile memory, supplies power to the volatile memory. When the acquisition process is executed while the power storage circuit is supplying power, the responder control circuit 183 reads the measurement data from the volatile memory and transmits the measurement data to the control apparatus 300.

Next, a bolt 21 according to a second embodiment of one or more embodiments will be described.

Figure 10:
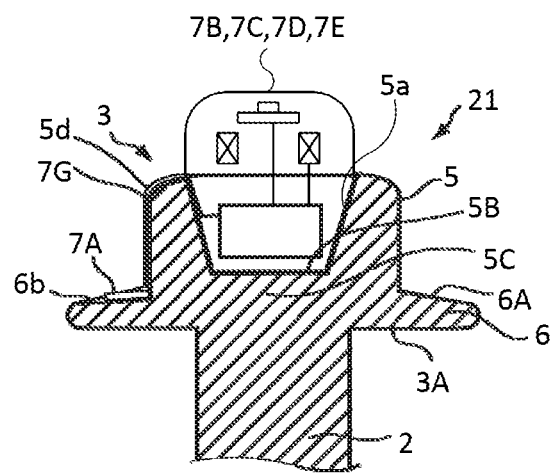
FIG. 10 is a cross-sectional view of a portion around a head of a bolt according to the second embodiment.

Components that are the same as the counterparts in the first embodiment are denoted with the same reference numerals, and the description thereof is omitted. Thus, only the difference will be described. FIG. 10 is a cross-sectional view of a portion around a head of the bolt according to the second embodiment.

As shown in FIG. 10, in this embodiment, a dent 6b is partially formed on the opposite surface 6A of the flange 6. The resistance strain gauge 7A is adhered on the dent 6b with adhesive. Thus, the resistance strain gauge 7A is contained in the dent 6b so as not to hinder the tightening of the bolt 1. In a similar manner to the first embodiment, the circuit portion 7C is arranged in the recess 5a and the power receiving coil 7B, the responder antenna 7D, and the responder circuit 7E are arranged outside the recess 5a at a distance from the head 3. A processing portion including the circuit portion 7C, the power receiving coil 7B, the responder antenna 7D, and the responder circuit 7E are integrally constituted by the resin 7F.

A connecting groove 5d is formed in the recessed portion 5 and connects between the recess 5a and the dent 6b. The resistance strain gauge 7A and the output circuit 7B are connected to each other through the signal line 7C routed along the connecting groove 5d. As described in the first embodiment, the largest thickness T2 (FIG. 3) of the flange 6 is set to be smaller than the largest thickness T3 (FIG. 3) of the head 3.

As in the case of the bolt 1 according to the first embodiment, in a state where the first and the second fastened objects 10 and 11 (FIG. 5) are fastened by the bolt 21, the stress is concentrated on the flange 6 having a thickness smaller than the largest thickness T3 of the head 3, due to the axial force produced in the shank 2, and thus the flange 6 is more deformed than other portions of the head 3, as in the case of the bolt 1. In other words, the stress is concentrated on a portion around the boundary between the recessed portion 5 and the flange 6 having a thickness smaller than the largest thickness T3 of the head 3, and thus the portion around the boundary between the recessed portion 5 and the flange 6 is more deformed than the other portions.

Due to the control apparatus 300 generating a magnetic field toward the power receiving coil 7B in the instruction process, the circuit portion 7C detects a strain occurring on the flange 6 as a resistance value, converts the resistance value into measurement data, and writes the measurement data to the non-volatile memory 181.

As in the case of the bolt 1 according to the first embodiment, in the bolt 21 according to this embodiment, the strain detection unit 7 can accurately detect the change in the axial force of the shank 2, whereby the fastened state of the bolt 21 can be accurately confirmed. The flange 6 can be easily formed in the head 3, whereby the bolt 21 that can have the fastened state accurately confirmed and involves no complex operation, long operation time, or high cost.

Next, a bolt 41 according to a third embodiment of one or more embodiments will be described.

Figure 11:
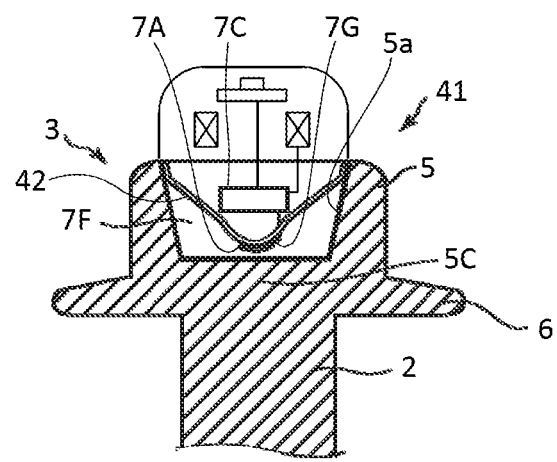
FIG. 11 is a cross-sectional view of a portion around the head of a bolt according to a third embodiment.

Components that are the same as the counterparts in the first embodiment are denoted with the same reference numerals, and the description thereof is omitted. Thus, only the difference will be described. FIG. 11 is a cross-sectional view of a portion around the head 3 of the bolt 41 according to the third embodiment.

The head 3 includes a leaf spring 42 having a smaller value of Young's modulus than the recessed portion 5. The leaf spring 42 has both ends disposed on respective free ends of the recessed portion 5 (opening of the recess 5a). The resistance strain gauge 7A is adhered on a center portion of the leaf spring 42 with adhesive. The leaf spring 42 corresponds to the deformed portion. The leaf spring 42 and the strain detection unit 7 are integrated by the resin piece 7F, and are fixed on the recess 5a with adhesive.

Also in this embodiment, as in the case of the bolt 1 in the embodiment described above, the head 3 is pulled toward the fastened object by the axial force of the shank 2, in a state where the fastened object is fastened by the bolt 41. As a result, the bottom plate 5C and the flange 6 largely deform to cause displacement (deformation) of the free ends of the recessed portion 5 toward the center axis of the shank 2. Due to the displacement (deformation) of the free ends of the recessed portion 5, both ends of the leaf spring 42 are pressed to move closer to each other and the leaf spring 42 is thereby deformed. The leaf spring 42 has a smaller value of Young's module than the head 3 made of a steel material, and is deformed such that both ends of the leaf spring 42 move closer to each other. Accordingly, the leaf spring 42 is more deformed than the recessed portion 5. Thus, the leaf spring 42 is disposed in the recessed portion 5 in such a manner as to deform in accordance with the deformation of the recessed portion 5.

In addition, a strain at a central portion of the leaf spring 42 is detected by the resistance strain gauge 7A. In a similar manner to the first embodiment, due to the control apparatus 300 generating a magnetic field toward the power receiving coil 7B in the instruction process, the circuit portion 7C converts a resistance value of the resistance strain gauge 7A into measurement data and writes the measurement data to the non-volatile memory 181.

As in the case of the bolt 1 according to the first embodiment, in the bolt 41 according to the present embodiment, the strain detection unit 7 can accurately detect the change in the axial force of the shank 2, whereby the fastened state of the bolt 41 can be accurately confirmed.

Figure 12:
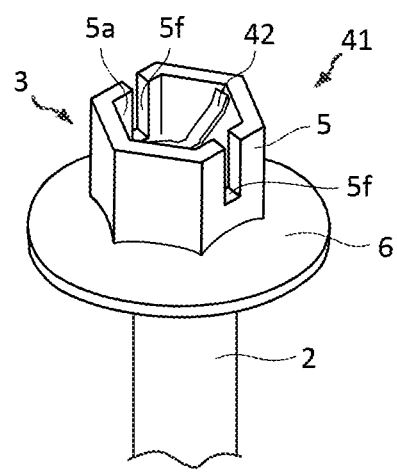
FIG. 12 is a schematic view of a bolt according to a modification to the third embodiment.

In addition, as shown in FIG. 12, in the bolt 41 according to the third embodiment, a slit 5f may be respectively formed on one side wall and another side wall positioned on an opposite side to the one side wall of the hexagonal column-shaped recessed portion 5. According to this configuration, a displacement of a free end of the recessed portion 5 can be further increased and strain on the leaf spring 42 can be further increased.

As a result, sensitivity of the resistance strain gauge 7A with respect to a variance in an axial force can be further increased and a fastened state of the bolt 41 can be assessed more accurately. Note that in FIG. 12, only the leaf spring 42 is shown and the strain detecting unit 7 is not shown.

Next, a bolt 61 according to a fourth embodiment of one or more embodiments will be described.

Figure 13:
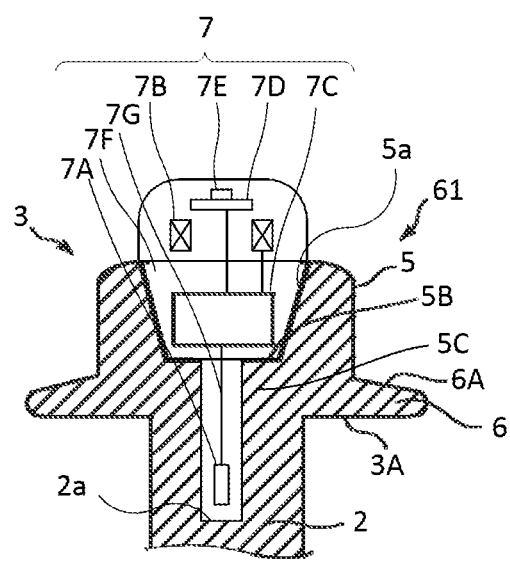
FIG. 13 is a cross-sectional view of a portion around the head of a bolt according to a fourth embodiment.

It should be noted that same members as the first embodiment will be denoted by same reference numerals and descriptions thereof will be omitted, and only different portions will be described. FIG. 13 is a sectional view of a vicinity of the head 3 of the bolt 61 according to the fourth embodiment.

The bolt 61 according to the present embodiment is formed with a hole 2a which reaches the inside of the shank 2 from the recess 5a along an axis of the shank 2. The resistance strain gauge 7A is arranged parallel to the axis of the shank 2 and is affixed to an inner wall surface of the hole 2a. Accordingly, an axial force of the shank 2 can be measured with high accuracy.

In addition, while the strain detecting unit 7 is a foil gauge in the respective embodiments described earlier, the strain detecting unit 7 may be a semiconductor gauge and a detection circuit may be formed by printing on the bottom plate 5C or the flange 6.

What is claimed is:

1. A bolt, comprising:
a body including a shank and a head provided at one end of the shank; and
a detecting portion that is configured to detect a strain in accordance with an axial force of the shank, wherein
the detecting portion includes:
a memory;
a measuring portion that is configured to operate by receiving a first wireless power feed, convert the strain into measurement data, and write the measurement data to the memory; and
a transmitting portion that is configured to operate by receiving a second wireless power feed after the first wireless power feed, read the measurement data stored in the memory, and transmit the read measurement data.

2. The bolt according to claim 1, wherein
the memory is a non-volatile memory.

3. The bolt according to claim 2, wherein
the measuring portion includes:
a strain detection circuit that is configured to convert the strain into a signal;
a power receiving coil that is configured to receive the first wireless power feed; and
a measurement circuit that is configured to operate by the first wireless power feed, convert the signal from the strain detection circuit into measurement data, and write the measurement data to the memory, and
the transmitting portion includes:
a communication antenna that is configured to receive the second wireless power feed; and
a communication circuit that is configured to operate by the second wireless power feed, read the measurement data from the memory, generate a response signal indicating the read measurement data, and transmit, by the communication antenna, the response signal as an electromagnetic wave.

4. The bolt according to claim 3, wherein
the strain detection circuit is a bridge circuit including at least one strain gauge, and
the measurement circuit is configured to amplify an output of the strain detection circuit and convert the amplified signal into the measurement data.

5. The bolt according to claim 4, wherein
the body includes a recess having an opening at the head,
the measurement circuit is arranged inside the recess, and
the power receiving coil is arranged outside of the recess at a distance from the body.

6. The bolt according to claim 5, wherein
the communication antenna is arranged outside of the recess at a distance from the body on an axis of the power receiving coil.

7. The bolt according to claim 6, wherein
the strain gauge is arranged on an inner wall surface of the recess.

8. The bolt according to claim 7, wherein
the recess is formed on the head, and
the strain gauge is arranged on an inner wall surface positioned on the shank side, of the recess.

9. The bolt according to claim 1, wherein
the first wireless power feed has a preset first frequency, and
the second wireless power feed has a second frequency that is higher than the first frequency.

10. The bolt according to claim 3, wherein
the measurement circuit includes a rectification circuit, a first capacitor that is connected in series to the power receiving coil and is connected in series to the rectification circuit, and a second capacitor that is connected in series to the first capacitor and is connected in parallel to the rectification circuit, and
the power receiving coil, the first capacitor, and the second capacitor constitute a resonance circuit.

11. The bolt according to claim 2, wherein
the memory is configured to store an identifier written in advance, and
the transmitting portion is configured to operate by receiving the second wireless power feed, read the measurement data and the identifier from the memory, and transmit the measurement data and the identifier.

12. A control apparatus that is configured to control a detecting portion provided in a bolt, the control apparatus comprising:
a power transmitting portion that is configured to, by performing a first wireless power feed, cause the detecting portion to convert a strain on the bolt into measurement data, and cause the detecting portion to store the measurement data; and
a receiving portion that is configured to, by performing a second wireless power feed after the first wireless power feed, cause the detecting portion to transmit the stored measurement data, and receive the measurement data.

13. The control apparatus according to claim 12, wherein
the power transmitting portion includes:
a power transmission circuit that is configured to generate a power transmission signal during the first wireless power feed; and
a power transmitting coil that is configured to generate a magnetic flux based on the power transmission signal,
the receiving portion includes:
a communication control circuit that is configured to generate an interrogation signal during the second wireless power feed; and
a communication control antenna that is configured to transmit the interrogation signal as an electromagnetic wave and receive a response signal that is an electromagnetic wave from the transmitting portion, and
the communication control circuit is configured to convert the response signal into the measurement data.

14. The control apparatus according to claim 13, wherein
an inner circumference of the power transmitting coil is larger than an outer circumference of a head of the bolt, and
the communication control antenna is arranged on an axis of the power transmitting coil.

15. The control apparatus according to claim 13, further comprising:
an output device; and
a computing device that is configured to generate output data indicating at least any one of a character, an image, and a sound based on the measurement data and is configured to cause the output device to output the output data.

16. A strain measurement system comprising:
a bolt; and
a control apparatus that is configured to control a circuit provided in the bolt, wherein
the bolt includes:
a body including a shank and a head provided at one end of the shank; and a detecting portion that is configured to detect a strain in accordance with an axial force of the shank, the detecting portion includes:

a memory;

a measuring portion that is configured to, in accordance with a first wireless power feed, convert the strain into measurement data, and write the measurement data to the memory; and a communicating portion that is configured to, in accordance with a second wireless power feed after the first wireless power feed, read the measurement data stored in the memory, and transmit the read measurement data, and the control apparatus includes:

a power transmitting portion that is configured to, by performing the first wireless power feed, cause the measuring portion to convert a strain on the bolt into the measurement data, and store the measurement data in the memory; and a receiving portion that is configured to, by performing the second wireless power feed after the first wireless power feed, cause the transmitting portion to transmit the stored measurement data, and receive the measurement data.

* * * * *